(12) United States Patent
Hidaka

(10) Patent No.: US 8,937,990 B2
(45) Date of Patent: Jan. 20, 2015

(54) LOW-FREQUENCY EQUALIZER CIRCUIT FOR A HIGH-SPEED BROADBAND SIGNAL

(75) Inventor: Yasuo Hidaka, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 13/601,752

(22) Filed: Aug. 31, 2012

(65) Prior Publication Data

US 2014/0062622 A1 Mar. 6, 2014

(51) Int. Cl.
*H03H 7/40* (2006.01)

(52) U.S. Cl.
USPC .......................................... 375/229

(58) Field of Classification Search
CPC ............... H04L 27/01; H04L 25/03885; H04L 25/03019; H04L 255/03878; H04L 25/03006; H04L 2027/0038
USPC ........... 375/230, 232–233, 350; 708/322–323
See application file for complete search history.

(56) References Cited

U.S. PATENT DOCUMENTS

| | | | |
|---|---|---|---|
| 3,444,474 A | 5/1969 | Borenstein et al. | |
| 4,273,963 A | 6/1981 | Seidel | |
| 6,463,108 B1 * | 10/2002 | Shakiba | 375/345 |
| 6,788,739 B1 * | 9/2004 | Higashino | 375/229 |
| 7,043,206 B2 * | 5/2006 | Herdey et al. | 455/63.1 |
| RE40,038 E * | 1/2008 | Shakiba | 375/319 |
| 7,869,496 B1 * | 1/2011 | Yang | 375/229 |
| 8,319,579 B2 * | 11/2012 | Zhuang et al. | 333/28 R |
| 2002/0157117 A1 * | 10/2002 | Geil et al. | 725/139 |
| 2010/0008414 A1 * | 1/2010 | Lee et al. | 375/233 |
| 2010/0111156 A1 * | 5/2010 | Luo et al. | 375/229 |
| 2014/0056345 A1 * | 2/2014 | Dickson et al. | 375/233 |

OTHER PUBLICATIONS

Pearson, "Adjustable Cable Equalizer Combines Wideband Differential Receiver with Analog Switches", Analog Dialogue, Jul. 2004, vol. 38, No. 3, pp. 13-17.

* cited by examiner

*Primary Examiner* — Khanh C Tran
(74) *Attorney, Agent, or Firm* — Maschoff Brennan

(57) ABSTRACT

A method of compensating for loss of a high-speed broadband signal may include receiving a high-speed broadband signal. The method may also include at least partially compensating for a low-frequency loss associated with a low-frequency component of the high-speed broadband signal. The compensation for the low-frequency loss may be based on a transfer function that may include a pole with a pole-frequency associated with the low-frequency component of the high-speed broadband signal.

18 Claims, 7 Drawing Sheets

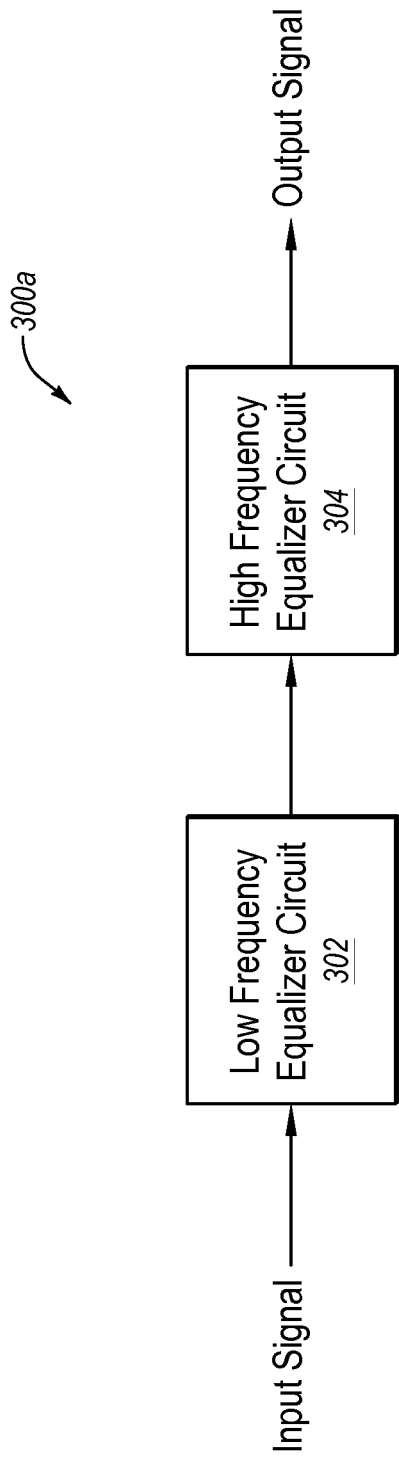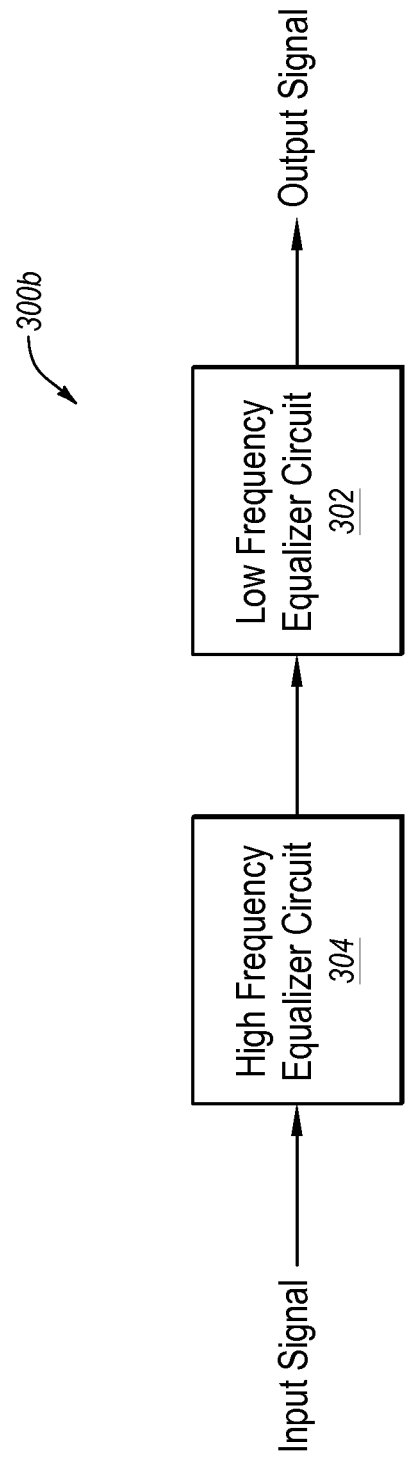
Fig. 3A
Fig. 3B

LOW-FREQUENCY EQUALIZER CIRCUIT FOR A HIGH-SPEED BROADBAND SIGNAL

FIELD

The embodiments discussed herein are related to low-frequency equalizers for high-speed broadband signals.

BACKGROUND

Electronic systems may include many integrated circuits (IC's) that communicate with each other by transmitting and receiving signals. The signals may experience signal degeneration in the form of signal distortion, such as, inter-symbol interference (ISI). One common way to compensate for such degeneration is to implement an equalizer circuit.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of compensating for loss of a high-speed broadband signal may include receiving a high-speed broadband signal. The method may also include at least partially compensating for a low-frequency loss associated with a low-frequency component of the high-speed broadband signal. The compensation for the low-frequency loss may be based on a transfer function that includes a pole with a pole-frequency associated with the low-frequency component of the high-speed broadband signal.

The object and advantages of the embodiments will be realized and achieved at least by the elements, features, and combinations particularly pointed out in the claims. It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which:

FIG. 3A illustrates an example ISI compensation system configured to at least partially compensate for low-frequency loss of a high-speed broadband signal;

FIG. 3B illustrates another example ISI compensation system configured to at least partially compensate for low-frequency loss of a high-speed broadband signal;

DESCRIPTION OF EMBODIMENTS

Electronic systems may include many integrated circuits (IC's) that communicate with each other by transmitting and receiving high-speed broadband signals (e.g., signals with a broad range of frequency components and data rates greater than one gigabit per second (1 Gb/s)) over channels of the electronic systems. The high-speed broadband signals may experience signal degeneration in the form of inter-symbol interference (ISI). The ISI may result from frequency-dependent loss where a high-frequency component of a high-speed broadband signal may be attenuated more than a low-frequency component of the high-speed broadband signal. The frequency-dependent loss may be caused by any number of factors such as skin effect and dielectric loss. As discussed further below, conventional compensation has been performed for the loss associated with high-frequency components of the high-speed broadband but has not been performed for the loss associated with lower frequency components of the high-speed broadband signal.

One common way to compensate for ISI is to implement an equalizer circuit. Conventional implementations of equalizer circuits for ISI compensation of high-speed broadband signals primarily compensate for loss associated with the high-frequency component of the high-speed broadband signal. However, these equalizer circuits do not provide much compensation for the loss associated with the low-frequency component of the high-speed broadband signal. The loss associated with the high-frequency component of the high-speed broadband signal may be referred to hereinafter as "high-frequency loss." The loss associated with the low-frequency component of the low-speed signal may be referred to hereinafter as "low-frequency loss." Additionally, the term "low-frequency component" may refer to a frequency component of the high-speed broadband signal that may be substantially lower in frequency than the high-frequency component, but may be higher in frequency than an even lower frequency component of the high-speed broadband signal such as a DC component of the high-speed broadband signal.

Figure 1:
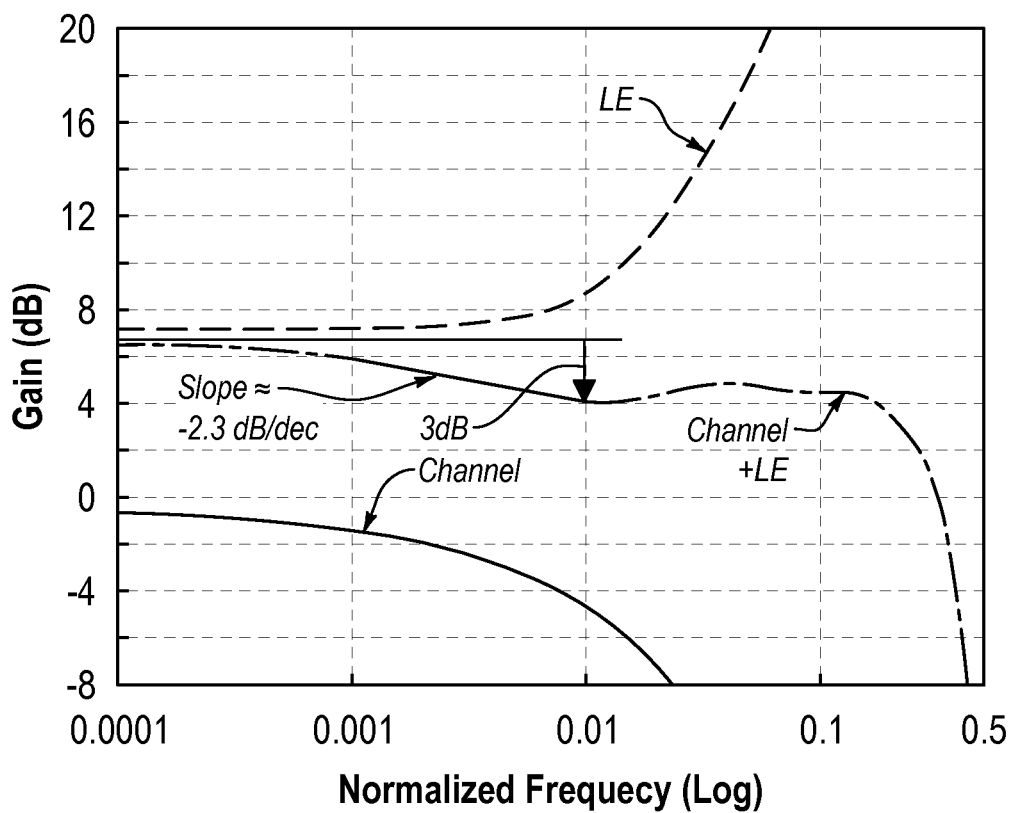
FIG. 1 is an example graph of a frequency response of a conventional linear equalizer circuit configured to compensate for high-frequency loss associated with a channel of an electronic system.

FIG. 1 is an example graph of a frequency response of a conventional equalizer circuit configured to compensate for high-frequency loss associated with a channel of an electronic system (depicted as a plot labeled "LE"). The conventional equalizer circuit configured to compensate for the high-frequency loss may be referred to hereinafter as a "conventional high-speed equalizer circuit." As discussed in further detail below, FIG. 1 illustrates that the conventional equalizer circuit may not provide much compensation for low-frequency loss of the high-speed broadband signal.

The graph of FIG. 1 also depicts a frequency response of the channel (depicted as a plot labeled "Channel"), and a frequency response of the channel as compensated for by the high-speed equalizer circuit (depicted as a plot labeled "Channel+LE"). In the illustrated example of FIG. 1, the channel as compensated for by the conventional high-speed linear equalizer circuit may experience a low-frequency loss with a gain slope of approximately −2.3 decibels per decade (dB/dec) for normalized frequencies that may be between approximately one one-thousandth (0.001) and one fiftieth (0.02) of a sampling frequency of the high-speed broadband signal propagating through the channel. On the other hand, the conventional high-speed equalizer circuit may have a relatively flat gain slope (0 dB/dec) in this low-frequency range of the high-speed broadband signal. Therefore, the high-speed linear equalizer circuit associated with FIG. 1 may not compensate for the loss of the low-frequency component of the high-speed broadband signal associated with 0.001 and 0.02 of the sampling frequency of the high-speed broadband signal. The conventional high-speed equalizer circuit may have the relatively flat gain slope in the low-frequency component because the conventional high-speed equalizer circuit may not have any poles lower than one fourth (0.25) or one half (0.5) of the sampling frequency in order to avoid additional high-frequency loss due to the poles. Therefore, the conventional high-speed equalizer circuit may not compensate for the low-frequency loss.

In contrast, once the gain begins to increase at around 0.02 of the sampling frequency of the high-speed broadband signal, the gain slope soon reaches to 20 decibels per decade (dB/dec). Therefore, the conventional high-speed equalizer may substantially compensate for loss associated with the higher frequency components of the high-speed broadband signal, but as mentioned above, may not compensate for low-frequency loss.

The relatively small low-frequency loss has been ignored in the art because it has not been recognized as a problem. A high-speed broadband signal with ISI compensation performed by a conventional high-speed equalizer circuit may be conventionally analyzed in the time domain within a relatively small number of Unit Intervals (UI) (e.g., less than 20 UI's) so that a pulse response of the high-speed broadband signal may be analyzed. A "Unit Interval" may be related to a symbol period of the high-speed broadband signal. The effects of low-frequency loss on the high-speed broadband signal in this relatively short time period may be negligible such that the low-frequency loss may be ignored based on a conventional analysis of the high-speed broadband signal. However, the effects of the low-frequency loss on the high-speed broadband signal may accumulate with time such that a cumulative sum of ISI caused by the low-frequency loss may continue to increase over a relatively long period of time that may include a relatively large number of UI's (e.g., greater than 50 UI's). Therefore, the low-frequency loss may adversely affect the high-speed broadband signal in a manner that may not be recognized by a conventional analysis of the pulse response of the high-speed broadband signal.

Figure 2A:
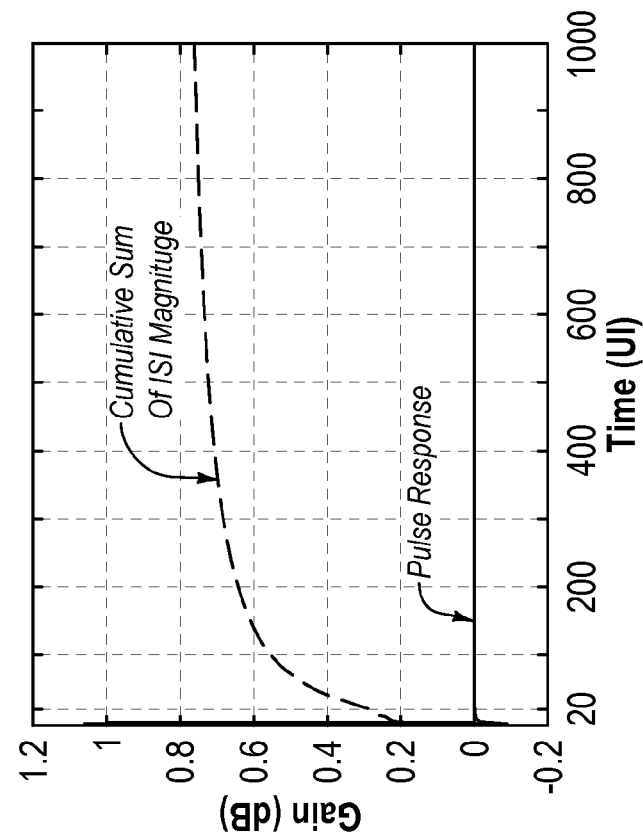
FIG. 2A is an example graph of a pulse response of a high-speed broadband signal for a relatively short time period where the high-speed broadband signal may have high-frequency loss compensation performed by a conventional high-frequency equalizer circuit.

FIG. 2A is an example graph of a pulse response of a high-speed broadband signal (referred to as "Pulse Response" in FIG. 2A) for a time period up to 20 UI where the high-speed broadband signal may have high-frequency loss compensation performed by a conventional high-frequency equalizer circuit. FIG. 2A also illustrates a target response (referred to as "Target Response" in FIG. 2A) of the high-speed broadband signal associated with the pulse response. The difference between the target response and the pulse response may indicate the ISI associated with the pulse response, which may be a conventional method of determining the ISI associated with a high-speed broadband signal. As illustrated in FIG. 2A, the difference between the target response and the pulse response may be sufficiently small such that a conventional method of determining ISI associated with the high-speed broadband signal may indicate that the ISI is sufficiently reduced. Accordingly, a conventional method of determining ISI associated with the high-speed broadband signal may not recognize that low-frequency loss of the high-speed broadband signal may adversely affect the high-speed broadband signal.

However, analyzing a cumulative sum of ISI magnitude of the high-speed broadband signal—which may not be performed in a conventional ISI analysis—may indicate that low-frequency loss of the high-speed broadband signal may adversely affect the high-speed broadband signal. For example, FIG. 2A also illustrates a cumulative sum of ISI magnitude of the high-speed broadband signal that may be related to the low-frequency loss of the high-speed broadband signal. As depicted in FIG. 2A, the cumulative sum of the ISI magnitude for the time period associated with the pulse response may be relatively low (e.g., approximately 0.2 of the magnitude of the pulse response.) But, FIG. 2A also illustrates that the cumulative sum of the ISI magnitude may continue to increase with time.

Figure 2B:
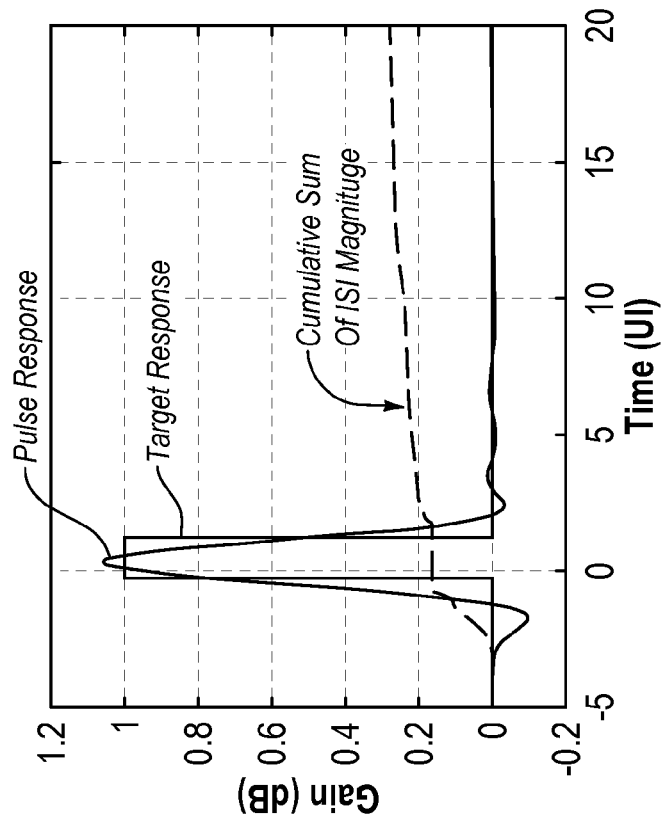
FIG. 2B is an example graph of the pulse response and cumulative sum of the ISI magnitude of FIG. 2A for a relatively long time period.

FIG. 2B is an example graph of the pulse response and cumulative sum of the ISI magnitude of FIG. 2A for a time period between 0 UI and 1000 UI. FIG. 2B illustrates that the cumulative sum of the ISI magnitude may substantially increase over a relatively long period of time. The increase of the cumulative sum of the ISI magnitude may be such that the cumulative sum of the ISI magnitude may be relatively high (e.g., approximately 0.8 of the magnitude of the pulse response) after the relatively long period of time (e.g., 1000 UI). Therefore, after a relatively long period of time, the cumulative sum of the ISI magnitude associated with the low-frequency loss may be such that the high-speed broadband signal may experience substantial degradation.

Consequently, according to at least an embodiment of the present disclosure an ISI compensation system may include an equalizer circuit that may be configured to at least partially compensate for low-frequency loss of a high-speed broadband signal. Accordingly, the cumulative ISI of the high-speed broadband signal associated with the low-frequency loss may be reduced. In contrast, as described above, conventional implementations of ISI compensation with respect to high-speed broadband signals may not compensate for the low-frequency loss such that the cumulative sum of the ISI of the high-speed broadband signal may increase due to the low-frequency loss.

Figure 2C:
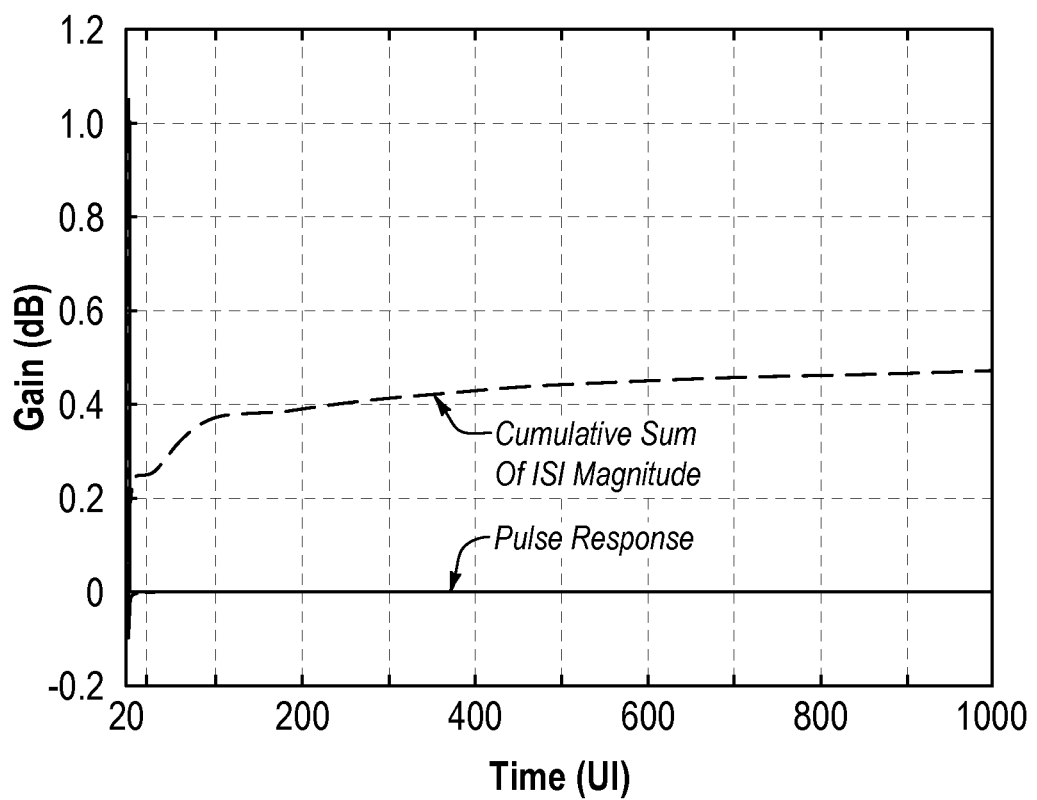
FIG. 2C is an example graph of a pulse response of a high-speed broadband signal where the high-speed broadband signal may have low-frequency loss compensation performed in accordance with the present disclosure.

For example, FIG. 2C is an example graph of a pulse response and cumulative sum of the ISI magnitude of the high-speed broadband signal where the high-speed broadband signal may have low-frequency loss compensation performed in accordance with the present disclosure. A comparison of FIG. 2B with FIG. 2C illustrates that the low-frequency loss compensation may reduce the cumulative sum of the ISI of the high-speed broadband signal.

Embodiments of the present disclosure will be explained with reference to the accompanying drawings.

FIG. 3A illustrates an example ISI compensation system 300a configured to at least partially compensate for low-frequency loss of a high-speed broadband signal, arranged in accordance with at least some embodiments described herein. The ISI compensation system 300a may include a low-frequency equalizer circuit 302 and a high-frequency equalizer circuit 304. The low-frequency equalizer circuit 302 may be configured to receive a high-speed broadband signal as an input signal. The low-frequency equalizer circuit 302 may be any suitable system, apparatus, or device configured to at least partially compensate for the low-frequency loss of the high-speed broadband signal such that ISI of the high-speed broadband signal associated with the low-frequency loss may be reduced. Example embodiments that may be used for the low-frequency equalizer circuit 302 are discussed in further detail below with respect to FIGS. 4-7. After reducing the low-frequency loss of the high-speed broadband signal, the low-frequency equalizer circuit 302 may communicate the high-speed broadband signal to the high-frequency equalizer circuit 304.

The high-frequency equalizer circuit 304 may be any suitable system, apparatus, or device configured to at least partially compensate for the high-frequency loss of the high-speed broadband signal. For example, the high-frequency equalizer circuit 304 may include a conventional high-speed equalizer circuit. After performing the high-frequency loss reduction, the high-frequency equalizer circuit 304 may output the high-speed broadband signal as an output signal.

The combination of the high-frequency equalizer circuit 304 and the low-frequency equalizer circuit 302 may be configured to at least partially compensate for both the high-frequency loss and the low-frequency loss that may be experienced by the high-speed broadband signal. Therefore, ISI associated with both the low-frequency loss and the high-frequency loss of the high-speed broadband signal may be reduced. In contrast, as detailed above with respect to FIGS. 1-2B, conventional implementations of ISI compensation of high-speed broadband signals may focus on the high-frequency loss of the high-speed broadband signals and may not adequately compensate for the low-frequency loss of the high-speed broadband signals.

Modifications, additions, or omissions may be made to FIG. 3A without departing from the scope of the present disclosure. For example, the ISI compensation system 300a may include other components that may be before, after, and/or between the low-frequency equalizer circuit 302 and the high-frequency equalizer circuit 304. Further, the low-frequency equalizer circuit 302 and/or the high-frequency equalizer circuit 304 may be included with a transmitting circuit, a receiving circuit, or any suitable combination thereof of an electronic system.

Additionally, the order of the high-frequency equalizer circuit 304 and the low-frequency equalizer circuit 302 receiving the high-speed broadband signal may vary. FIG. 3B illustrates an example ISI compensation system 300b where the high-frequency equalizer circuit 304 is configured to receive the high-speed broadband signal as the input signal instead of the low-frequency equalizer circuit 302 receiving the high-speed broadband signal as the input signal as depicted in FIG. 3A. The high-frequency equalizer circuit 304 of the ISI compensation system 300b may communicate the high-speed broadband signal to the low-frequency equalizer circuit 302 after reducing the high-frequency loss of the high-speed broadband signal. The low-frequency equalizer circuit 302 of the ISI compensation system 300b may at least partially compensate for the low-frequency loss and may output the high-speed broadband signal as the output signal.

Figure 4:
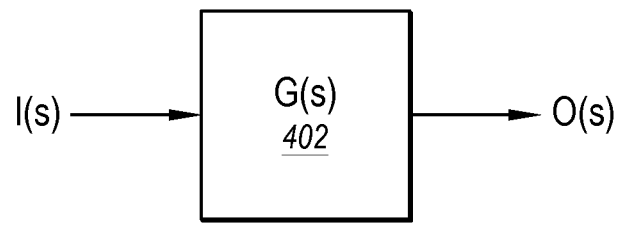
FIG. 4 illustrates an example low-frequency equalizer circuit configured to at least partially compensate for low-frequency loss of a high-speed broadband signal.

FIG. 4 illustrates an example low-frequency equalizer circuit 402 configured to at least partially compensate for low-frequency loss of a high-speed broadband signal, arranged in accordance with at least some embodiments described herein. The low-frequency equalizer circuit 402 may be implemented in any suitable ISI compensation system. For example, the low-frequency equalizer circuit 402 may be used as the low-frequency equalizer circuit 302 of the ISI compensation systems 300a and/or 300b of FIGS. 3A and 3B, respectively.

The low-frequency equalizer circuit 402 may be configured to receive a high-speed broadband signal as an input signal (depicted as "I(s)" in FIG. 4) and perform operations on the high-speed broadband signal based on a transfer function (depicted as "G(s)" in FIG. 4). The transfer function may be configured such that low-frequency loss of the high-speed broadband signal may be at least partially compensated for. After applying the transfer function to the high-speed broadband signal, the low-frequency equalizer circuit 402 may output the high-speed broadband signal as an output signal (depicted as "O(s)" in FIG. 4).

The transfer function of the low-frequency equalizer circuit 402 may include a pole-zero pair that may have a pole-frequency ($f_{pole}$) and a zero-frequency ($f_{zero}$) respectively and may be denoted by the following expression:

$$G(s) = \frac{O(s)}{I(s)} = k \frac{1 + \frac{s}{2\pi f_{zero}}}{1 + \frac{s}{2\pi f_{pole}}}$$

In the above expression, "k" may indicate a direct current (DC) gain applied to the high-speed broadband signal and "s" may indicate a complex frequency value of the high-speed broadband signal.

The pole and zero may be configured such that the pole-frequency and zero-frequency may be relatively close together and such that the pole-frequency is larger than the zero-frequency. For example, the ratio of the pole-frequency with respect to the zero-frequency may be greater than one, but less than two as denoted by the following expression:

$$1 \leq \frac{f_{pole}}{f_{zero}} \leq 2.$$

In some embodiments, the ratio of the pole-frequency with respect to the zero-frequency may be approximately equal to 1.5.

Additionally, to at least partially compensate for the low-frequency loss, the pole and zero may be configured such that the pole-frequency (and consequently the zero-frequency) may be within a low-frequency range associated with the low-frequency component of the high-speed broadband signal as expressed by the following expression:

$$\frac{f_{pole}}{f_s} \ll 1;$$

where $f_s$ is the sampling frequency of the high-speed broadband signal.

By way of example, the pole-frequency may be two or three orders of magnitude lower than the sampling frequency of the high-speed broadband signal and in some embodiments may be between approximately one one-thousandth (0.001) and one fiftieth (0.02) of the sampling frequency of the high-speed broadband signal.

The low-frequency equalizer circuit 402 configured with a transfer function that includes the pole-frequency and zero-frequency described above may at least partially compensate for the low-frequency loss of the high-speed broadband signal. Accordingly, the low-frequency equalizer circuit 402 may reduce ISI of the high-speed broadband signal that may be associated with the low-frequency loss of the high-speed broadband signal.

Figure 5:
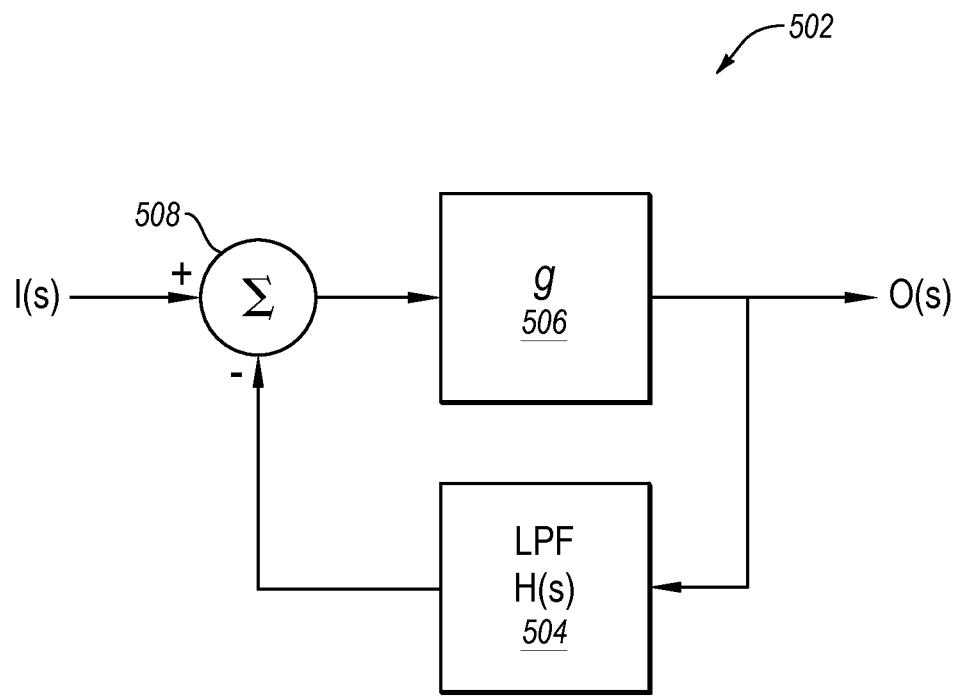
FIG. 5 illustrates another example low-frequency equalizer circuit configured to at least partially compensate for low-frequency loss of a high-speed broadband signal.

FIG. 5 illustrates an example low-frequency equalizer circuit 502 configured to at least partially compensate for low-frequency loss of a high-speed broadband signal, arranged in accordance with at least some embodiments described herein. The low-frequency equalizer circuit 502 may be implemented in any suitable ISI compensation system. For example, the low-frequency equalizer circuit 502 may be used as the low-frequency equalizer circuit 302 of the ISI compensation systems 300a and/or 300b of FIGS. 3A and 3B, respectively.

The low-frequency equalizer circuit 502 may include a summer 508, a broadband amplifier 506 and a low-pass filter (LPF) 504. The summer 508 may be configured to receive a high-speed broadband signal as an input signal (depicted as "I(s)" in FIG. 5). The summer 508 may also be configured to receive a low-frequency feedback signal from the LPF 504, which may be included in a low-frequency feedback loop of the low-frequency equalizer circuit 502. The summer 508 may be configured to combine the high-speed broadband signal with the low-frequency feedback signal as depicted in FIG. 5 to generate a combined signal. The broadband amplifier 506 may be configured to receive the combined signal from the summer 508. The broadband amplifier 506 may apply a broadband gain "g" to the combined signal that may be manifest as a high-frequency gain of the high-speed broadband signal. The broadband amplifier 506 may output the amplified broadband signal as an output signal (depicted as "O(s)" in FIG. 5) of the low-frequency equalizer circuit 502. The output signal "O(s)" may also be received by the LPF 504 to create the low-frequency feedback loop.

The broadband amplifier 506 and LPF 504 may be configured such that the low-frequency equalizer circuit 502 may have a transfer function (G(s)) that includes a pole-zero pair with a pole-frequency and a zero-frequency. The pole-frequency and zero-frequency of the transfer function of the low-frequency equalizer circuit 502 may be associated with a low-frequency component of the high-speed broadband signal similar to the pole-frequency and zero-frequency of the low-frequency equalizer circuit 402 of FIG. 4. Additionally, the pole-frequency and zero-frequency of the low-frequency equalizer circuit 502 may be substantially close to each other as described above with respect to the pole-zero pair of the low-frequency equalizer circuit 402 of FIG. 4.

For example, the LPF 504 may have a transfer function (depicted as "H(s)" in FIG. 5) that may be denoted by the following expression:

$$H(s) = \frac{h}{1 + \frac{s}{2\pi f_c}}$$

In the above expression, "h" may represent a direct current (DC) gain of the LPF 504 and "$f_c$" may represent a cut-off frequency of the LPF 504.

Based on the low-frequency feedback path, the transfer function "H(s)" of the LPF 504, the broadband gain "g" of the broadband amplifier 506, and the operation of the summer 508, the overall transfer function "G(s)" of the low-frequency equalizer circuit 502 may be denoted by the following expression:

$$G(s) = \frac{O(s)}{I(s)} = \frac{g}{1+gh} \times \frac{1 + \frac{s}{2\pi f_c}}{1 + \frac{s}{2\pi f_c(1+gh)}}$$

Based on the above expression of the transfer function of the low-frequency equalizer circuit 502, the zero-frequency ($f_{zero}$) and the pole-frequency ($f_{pole}$) of the transfer function may be denoted by the following expressions:

$f_{zero} = f_c$; and $f_{pole} = (1+gh)f_c$

Therefore, the LPF 504 may be configured such that the cut-off frequency "$f_c$" is substantially equal to a desired frequency for the zero-frequency. Additionally, the LPF 504 and broadband amplifier 506 may be configured such that the cut-off frequency "$f_c$," DC gain "h," and broadband gain "g" result in the pole-frequency having approximately a desired value associated with at least partially compensating for the low-frequency loss of the high-speed broadband signal.

As mentioned above, to at least partially compensate for the low-frequency loss of the high-speed broadband signal, the pole-frequency may be configured to be between 0.001 and 0.02 of the sampling frequency of the high-speed broadband signal. Additionally, the ratio of the pole-frequency with respect to the zero-frequency may be greater than or equal to one and less than or equal to two to at least partially compensate for the low-frequency loss. Therefore, the LPF 504 and broadband amplifier 506 may be configured such that the cut-off frequency "$f_c$," DC gain "h," and broadband gain "g" result in the pole-frequency and zero-frequency satisfying the above mentioned parameters. As such, the low-frequency equalizer circuit 502 may be configured to at least partially compensate for the low-frequency loss of the high-speed broadband signal via the summer 508, broadband amplifier 506, and low-frequency feedback loop that includes the LPF 504.

Figure 6:
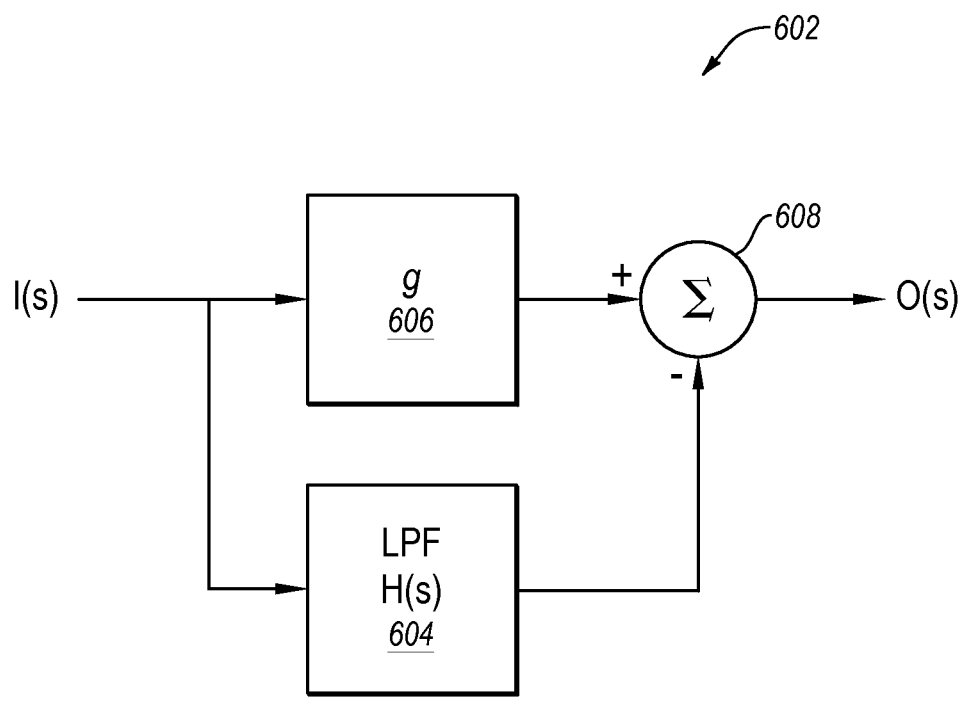
FIG. 6 illustrates another example low-frequency equalizer circuit configured to at least partially compensate for low-frequency loss of a high-speed broadband signal.

FIG. 6 illustrates another example low-frequency equalizer circuit 602 configured to at least partially compensate for low-frequency loss of a high-speed broadband signal, arranged in accordance with at least some embodiments described herein. The low-frequency equalizer circuit 602 may be implemented in any suitable ISI compensation system. For example, the low-frequency equalizer circuit 602 may be used as the low-frequency equalizer circuit 302 of the ISI compensation systems 300a and/or 300b of FIGS. 3A and 3B, respectively.

The low-frequency equalizer circuit 602 may include a summer 608, a broadband amplifier 606 and an LPF 604. The broadband amplifier 606 may be configured to receive a high-speed broadband signal as an input signal (depicted as "I(s)" in FIG. 6). The amplifier 606 may apply a broadband gain "g" to the received high-speed broadband signal that may be manifest as a high-frequency gain of the high-speed broadband signal.

The summer 608 may be configured to receive the amplified broadband signal from the broadband amplifier 606. The summer 608 may also be configured to receive a low-frequency feed-forward signal from the LPF 604, which may be included in a low-frequency feed-forward path of the low-frequency equalizer circuit 602. The summer 608 may be configured to combine the amplified broadband signal with the low-frequency feed-forward signal as depicted in FIG. 6 to generate an output signal (depicted as "O(s)" in FIG. 6) of the low-frequency equalizer circuit 602.

The broadband amplifier 606 and LPF 604 may be configured such that the low-frequency equalizer circuit 602 may have a transfer function (G(s)) that includes a pole-zero pair with a pole-frequency and a zero-frequency. The pole-frequency and zero-frequency of the transfer function of the low-frequency equalizer circuit 602 may be associated with a low-frequency component of the high-speed broadband signal similar to the pole-frequency and zero-frequency of the low-frequency equalizer circuit 402 of FIG. 4. Additionally, the pole-frequency and zero-frequency of the low-frequency equalizer circuit 602 may be substantially close to each other as described above with respect to the pole-zero pair of the low-frequency equalizer circuit 402 of FIG. 4.

For example, the LPF 604 may have a transfer function (depicted as "H(s)" in FIG. 6) that may be substantially similar to the transfer function of the LPF 504 of FIG. 5 and that may be denoted by the following expression:

$$H(s) = \frac{h}{1 + \frac{s}{2\pi f_c}}$$

In the above expression, "h" may represent a direct current (DC) gain of the LPF 604 and "$f_c$" may represent a cut-off frequency of the LPF 604.

Based on the low-frequency feed-forward path, the transfer function "H(s)" of the LPF 604, the broadband gain "g" of the broadband amplifier 606, and the operation of the summer 608, the overall transfer function "G(s)" of the low-frequency equalizer circuit 602 may be denoted by the following expression:

$$G(s) = \frac{O(s)}{I(s)} = (g - h) \times \frac{1 + \frac{s}{2\pi f_c\left(1 - \frac{h}{g}\right)}}{1 + \frac{s}{2\pi f_c}}$$

Based on the above expression of the transfer function of the low-frequency equalizer circuit 602, the zero-frequency ($f_{zero}$) and the pole-frequency ($f_{pole}$) of the transfer function may be denoted by the following expressions:

$$f_{zero} = f_c\left(1 - \frac{h}{g}\right); \text{ and}$$

$$f_{pole} = f_c$$

Therefore, the LPF 604 may be configured such that the cut-off frequency "$f_c$" is substantially equal to a desired frequency for the pole-frequency. Additionally, the LPF 604 and broadband amplifier 606 may be configured such that the cut-off frequency "$f_c$," DC gain "h," and broadband gain "g" result in the zero-frequency having approximately a desired value associated with at least partially compensating for the low-frequency loss.

As mentioned above, to at least partially compensate for the low-frequency loss of the high-speed broadband signal, the pole-frequency may be configured to be between 0.001 and 0.02 of the sampling frequency of the high-speed broadband signal. Additionally, the ratio of the pole-frequency with respect to the zero-frequency may be greater than or equal to one and less than or equal to two. Therefore, the LPF 604 and broadband amplifier 606 may be configured such that the cut-off frequency "$f_c$," DC gain "h," and broadband gain "g" result in the pole-frequency and zero-frequency satisfying the above mentioned parameters. As such, the low-frequency equalizer circuit 602 may be configured to at least partially compensate for the low-frequency loss of the high-speed broadband signal via the summer 608, broadband amplifier 606 and low-frequency feed-forward path that includes the LPF 604.

Figure 7:
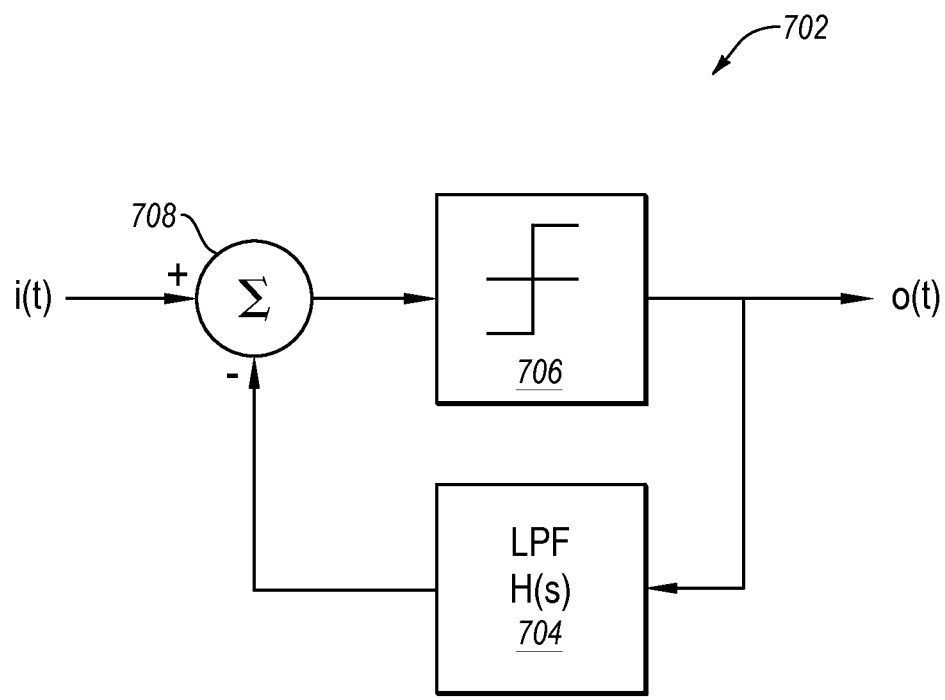
FIG. 7 illustrates another example low-frequency equalizer circuit configured to at least partially compensate for low-frequency loss of a high-speed broadband signal.

FIG. 7 illustrates another example low-frequency equalizer circuit 702 configured to at least partially compensate for low-frequency loss of a high-speed broadband signal, arranged in accordance with at least some embodiments described herein. The low-frequency equalizer circuit 702 may be implemented in any suitable ISI compensation system. For example, the low-frequency equalizer circuit 702 may be used as the low-frequency equalizer circuit 302 of the ISI compensation systems 300a and/or 300b of FIGS. 3A and 3B, respectively.

The low-frequency equalizer circuit 702 may be configured as a decision feedback equalizer (DFE) with an infinite impulse response (IIR) and may include a summer 708, a decision circuit 706 and an LPF 704. The summer 708 may be configured to receive a high-speed broadband signal as an input signal (depicted as "i(t)" in FIG. 7). The summer 708 may also be configured to receive a low-frequency feedback signal from the LPF 704 included in a feedback loop of the low-frequency equalizer circuit 702. The summer 708 may be configured to combine the high-speed broadband signal with the low-frequency feedback signal as depicted in FIG. 7 to generate a combined broadband signal.

The decision circuit 706 may be configured to receive the combined broadband signal from the summer 708. The decision circuit 706 may be configured to make a digital decision whether its input is higher or lower than a threshold level. The decision circuit 706 may output the digital decision as an output signal (depicted as "o(t)" in FIG. 7) of the low-frequency equalizer circuit 706. The output signal of the low-frequency equalizer circuit 702—which may also be associated with a digital decision value of the combined broadband signal—may also be received by the LPF 704 to create the low-frequency feedback loop. Therefore, the LPF 704 may perform operations based on previous digital decision values of the high-speed broadband signal in accordance with DFE implementations, which may result in an IIR filter. The IIR filter may result because the LPF 704 may have an impulse response of an infinite length. In addition, the decision circuit 706 may use a clock signal (not illustrated in FIG. 7) to sample the combined broadband signal and may make the digital decision at the clock signal rate.

The LPF 704 may be configured to have a transfer function substantially similar to that of the LPF 504 and the LPF 604 of FIGS. 5 and 6, respectively. The cut-off frequency of the LPF 704 may act as a pole-frequency of the transfer function of the LPF 704. The LPF 704 may be configured such that the cut-off frequency of the LPF 704 may be substantially smaller than the sampling frequency of the high-speed broadband signal (e.g., between 0.001 and 0.02 of the sampling frequency of the high-speed broadband signal) such that low-frequency loss of the high-speed broadband signal received by the low-frequency equalizer circuit 702 may be at least partially compensated for. Accordingly, the transfer function of the LPF 704,—that may be associated with the low-frequency equalizer circuit 702 configured as DFE IIR—may include a pole with a pole-frequency (e.g., the cut-off frequency of the LPF 704) associated with the low-frequency component of the high-speed broadband signal.

Figure 8:
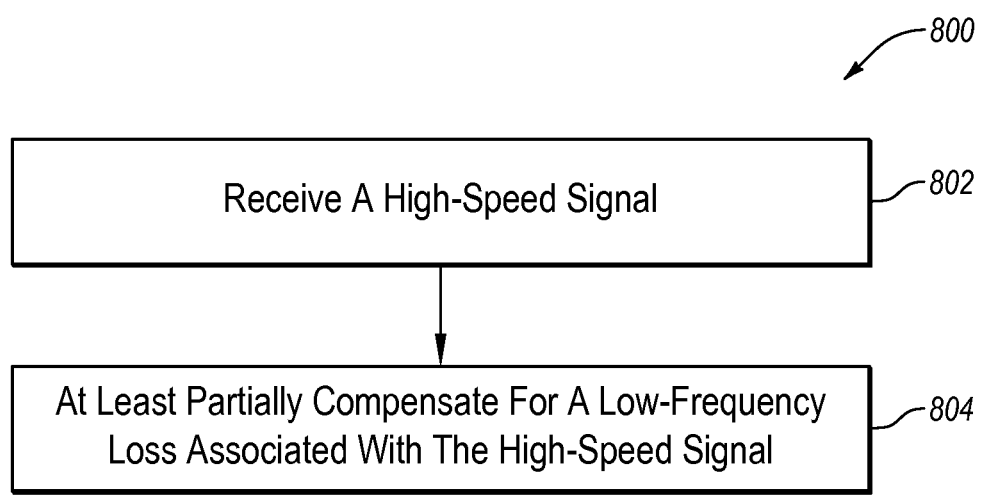
FIG. 8 is a flow chart of an example method of compensating for loss of a high-speed broadband signal.

FIG. 8 is a flow chart of an example method 800 of compensating for loss of a high-speed broadband signal, arranged in accordance with at least some embodiments described herein. The method 800 may be implemented, in some embodiments, by a low-frequency equalizer circuit 302, 402, 502, 602, or 702 of FIGS. 3, 4, 5, 6, and 7, respectively. Although illustrated as discrete blocks, various blocks may be divided into additional blocks, combined into fewer blocks, or eliminated, depending on the desired implementation.

The method 800 may begin at block 802 where a high-speed broadband signal may be received. In block 804 a low-frequency loss associated with a low-frequency component of the high-speed broadband signal may be at least partially compensated for based on a transfer function. The transfer function may include a pole with a pole-frequency associated with the low-frequency component of the high-speed broadband signal. In some embodiments, the low-frequency loss may be at least partially compensated for via a low-frequency feedback loop that may include an LPF with a cut-off frequency that may be associated with the pole-frequency. In some embodiments, the low-frequency loss may be at least partially compensated for via a low-frequency feed-forward path that includes an LPF with a cut-off frequency that may be associated with the pole-frequency. In some embodiments, the low-frequency loss may be at least partially compensated for via an DFE IIR that may include an LPF with a cut-off frequency that may be associated with the pole-frequency.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For instance, the method 800 may further include steps and operations associated with at least partially compensating for high-frequency loss of the high-speed broadband signal.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system for compensating for loss of a high-speed broadband signal, the system comprising:
an input configured to receive a high-speed broadband signal; and
a low-frequency equalizer circuit communicatively coupled to the input and configured to at least partially compensate for a low-frequency loss associated with a low-frequency component of the high-speed broadband signal and a transfer function associated with the low-frequency equalizer circuit, the transfer function including a pole with a pole-frequency associated with the low-frequency component of the high-speed broadband signal and a zero with a zero-frequency associated with the low-frequency component of the high-speed broadband signal, a ratio of the pole-frequency with respect to the zero-frequency being between approximately one and two.

2. The system of claim 1, wherein the pole-frequency is at least an order of magnitude lower than a sampling frequency of the high-speed broadband signal.

3. The system of claim 1, wherein the high-speed broadband signal has a data rate that is at least one gigabit per second (1 Gbps).

4. The system of claim 1, wherein the pole-frequency is between approximately one one-thousandth (0.001) and one fiftieth (0.02) of a sampling frequency of the high-speed broadband signal.

5. The system of claim 1, wherein the low-frequency equalizer circuit comprises a feedback loop that includes a low-pass filter (LPF), the LPF having a cut-off frequency associated with the zero-frequency.

6. The system of claim 1, wherein the low-frequency equalizer circuit comprises a feed-forward path that includes a low-pass filter (LPF), the LPF having a cut-off frequency associated with the pole-frequency.

7. The system of claim 1, further comprising a high-frequency equalizer circuit communicatively coupled to at least one of the input and the low-frequency equalizer circuit and configured to compensate for a high-frequency loss associated with a high-frequency component of the high-speed broadband signal.

8. A method of compensating for loss of a high-speed broadband signal, the method comprising:
receiving a high-speed broadband signal; and
at least partially compensating for a low-frequency loss associated with a low-frequency component of the high-speed broadband signal based on a transfer function that includes a pole with a pole-frequency associated with the low-frequency component of the high-speed broadband signal and a zero with a zero-frequency associated with the low-frequency component of the high-speed broadband signal, a ratio of the pole-frequency with respect to the zero-frequency being between approximately one and two.

9. The method of claim 8, wherein the pole-frequency is at least an order of magnitude lower than a sampling frequency of the high-speed broadband signal.

10. The method of claim 8, wherein the high-speed broadband signal has a data rate that is at least one gigabit per second (1 Gbps).

11. The method of claim 8, wherein the pole-frequency is between approximately one one-thousandth (0.001) and one fiftieth (0.02) of a sampling frequency of the high-speed broadband signal.

12. The method of claim 8, further comprising at least partially compensating for the low-frequency loss via a feedback loop that includes a low-pass filter (LPF), the LPF having a cut-off frequency associated with the zero-frequency.

13. The method of claim 8, further comprising at least partially compensating for the low-frequency loss via a feed-forward path that includes a low-pass filter (LPF), the LPF having a cut-off frequency associated with the pole-frequency.

14. The method of claim 8, further comprising at least partially compensating for a high-frequency loss associated with a high-frequency component of the high-speed broadband signal.

15. A system for compensating for loss of a high-speed broadband signal, the system comprising:
an input configured to receive a high-speed broadband signal;

a low-frequency equalizer circuit communicatively coupled to the input and configured to at least partially compensate for a low-frequency loss associated with a low-frequency component of the high-speed broadband signal and a transfer function associated with the low-frequency equalizer circuit, the transfer function including a pole with a pole-frequency associated with the low-frequency component of the high-speed broadband signal, the low-frequency equalizer circuit comprising a decision feedback equalizer that includes a low-pass filter (LPF) as an infinite impulse response (IIR) feedback filter, the LPF having a cut-off frequency associated with the pole-frequency; and a high-frequency equalizer circuit communicatively coupled to at least one of the input and the low-frequency equalizer circuit and configured to compensate for a high-frequency loss associated with a high-frequency component of the high-speed broadband signal.

16. The system of claim 15, wherein the pole-frequency is at least an order of magnitude lower than a sampling frequency of the high-speed broadband signal.

17. The system of claim 15, wherein the high-speed broadband signal has a data rate that is at least one gigabit per second (1 Gbps).

18. The system of claim 15, wherein the pole-frequency is between approximately one one-thousandth (0.001) and one fiftieth (0.02) of a sampling frequency of the high-speed broadband signal.

* * * * *